United States Patent [19]

Combet

[11] 3,758,766

[45] Sept. 11, 1973

[54] CIRCUIT FOR THE PARALLEL CONVERSION OF NUMBERS A INTO A BASE A INTO NUMBERS B TO A BASE OF B OR VICE VERSA

[75] Inventor: Michel Combet, Travedona/Varese, Italy

[73] Assignee: European Atomic Energy Community (Euratom), European Center Kirchberg, Luxembourg

[22] Filed: Feb. 12, 1971

[21] Appl. No.: 115,037

[30] Foreign Application Priority Data

Feb. 27, 1970 Germany .................. P 20 10 428.3

[52] U.S. Cl. .......... 235/155, 340/347 DD, 235/168, 235/173

[51] Int. Cl. .......................................... H03k 13/24

[58] Field of Search ............. 340/347 DD; 235/155, 235/168, 169, 173, 194, 175

[56] References Cited

UNITED STATES PATENTS

| | | | |
|---|---|---|---|
| 3,449,555 | 6/1969 | Wang | 235/155 |
| 3,191,014 | 6/1965 | Roth et al. | 235/175 |
| 3,535,500 | 10/1970 | Hu | 235/155 |
| 3,535,498 | 10/1970 | Smith, Jr. | 235/155 X |

FOREIGN PATENTS OR APPLICATIONS

| | | | |
|---|---|---|---|
| 1,035,511 | 7/1966 | Great Britain | 340/347 DD |
| 942,925 | 11/1963 | Great Britain | 340/347 DD |

OTHER PUBLICATIONS

Isberg "IBM Technical Disclosure Bulletin" Vol. 8, No. 1, June 1965 pg. 80–81

*Primary Examiner*—Charles D. Miller
*Attorney*—Stevens, Davis, Miller & Mosher

[57] ABSTRACT

A circuit for the parallel conversion of numbers expressed in terms of one base to numbers expressed in terms of another base, typically decimal numbers to binary numbers and vice versa comprises a matrix whose lines and columns constitute oriented transmission paths for the numbers expressed to the respective bases and at the crossing points interconnecting logic elements causing the production of new line and column data by multiplication of incoming column data by a modulo b, the incoming line data being regarded as a carry over from a next lower digit value and new line data resulting from the multiplication carry forward modulo b.

3 Claims, 8 Drawing Figures

CIRCUIT FOR THE PARALLEL CONVERSION OF NUMBERS A INTO A BASE A INTO NUMBERS B TO A BASE OF B OR VICE VERSA

FIELD OF THE INVENTION

The invention relates to the parallel conversion of numbers A to a base of *a* into numbers B to a base of *b* and vice versa, in particular the conversion of binary numbers and decimal numbers respectively.

BACKGROUND OF THE INVENTION

A number system to a base of *a* refers to a system in which the numerals may be represented by different states of a physical quantity, for example the electric voltage *a*, or in which a plurality of elements, preferably binary elements, are used to represent a single numeral. Encoding of decimal numerals in the BCD-code (binary coded decimal) or in a redundant security code, for example the "two-out-of-five" code, is of particular practical importance.

By contrast to circuits in which conversion is performed successively and in steps, networks for purely parallel conversion are very complex and call for a substantial material effort. In general, this effort increases with the square of the number of digits. Such networks were able to gain practical importance only by utilizing modern, high-speed integrated circuits with active, amplifying elements connected downstream of each logic function, since such circuits can be serially connected in almost any desired number without causing any undesirable signal attenuation or substantial transit times.

Many attempts have been made hitherto to optimise such networks with reference to certain requirements, for example in order to minimise the number of elementary logic functions or with reference to a certain length (i.e. the number of logic functions between input and output) for all possible signal paths or by reference to a defined logic standard form (for example disjunctive normal form) or by reference to a defined number of inputs for each logic function (fan-in). This resulted in highly complex networks which could be analytically treated only by means of an automatic computer, such network being moreover suitable for only a single logic function. The network for a binary-decimal conversion and the network for a decimal-binary conversion are as fundamentally different from each other as networks for the conversion of whole numbers are different from networks for the conversion of numbers which are smaller than one; this also applies if the decimal numbers are encoded in different codes. In the same way it is also not possible for optimised networks to be extended at will and without difficulty as regards the digit capacity: a network for five decimal digits cannot be used as a basic module for an optimised network having six digits. This lack of flexibility represents a substantial obstacle, militating against the use of integrated micro circuits which require simple and frequently repeating patterns of such networks.

The invention avoids all these disadvantages by proceeding from a completely different basic concept of such networks such as have recently become known under the name of iterative networks (see for example Electronic Engineering, Dec. 1968, page 694 et seq.). Logic circuits of the chain or matrix kind have already been proposed for different computer operations, one basic element having a logic structure which is relatively complicated compared with that of conventional elementary logic functions being constantly repeated in such logic circuits. According to the prior art of integrated circuits, such an element can be easily produced in the form of a micro module.

SUMMARY OF THE INVENTION

The inventive circuit for the parallel conversion of numbers A to a base of *a* into numbers B to a base of *b* or vice versa is characterised by an electric matrix, the lines of which are constructed as orientated transmission paths for numbers A and whose columns are constructed as orientated transmission paths for numbers B and each of whose crossing points is provided with one logic element for interconnecting the incoming line and column data, said element being so constructed as to produce line and column data so that the new column data is formed by multiplication of the incoming column data with the factor *a* modulo *b*, the incoming line data being allowed for as a carry-over from a next lower digit value and new line data resulting from the multiplication carry forward modulo *b*.

This matrix according to the invention may be optionally operated in two different ways in accordance with a further feature of the invention: to convert whole numbers to the base *a* into whole numbers to the base *b*, data 0 is applied to all column inputs, result lines are applied to all column outputs and the number to be converted is applied to all line inputs so that the lowest numeral, that is to say having the digit value ONE being applied to the last line adjacent to the column outputs.

Without changing the circuit it is possible for the same matrix to be employed for converting numbers smaller than ONE, starting from the number B which is applied to all column inputs, the number A being read off from the line outputs. At the same time, the data ZERO is applied to all line inputs. It is therefore merely necessary for circuit means to be provided to supply and to read off the numbers to be converted and those that have been converted at the correct side of the matrix in order to obtain selectable operation for fractional or whole numbers.

In accordance with a further embodiment of the invention, two such matrices are provided of which one has logic elements adapted to multiply with the factor *a* modulo *b* while the logic elements of the other matrix multiply with the factor *b* modulo *a*. In this way it is possible for whole number as well as fractional number values of numbers Z (for example to the base 2) to be converted into corresponding numbers D (for example to the base 10) and vice versa.

It will be evident that the matrices according to the invention are well suited for a practical embodiment with micro-logic modules since all logic elements within one matrix are identical. In a preferred embodiment, the individual modules are so constructed that they can be easily stacked, so that their edge terminals may be joined to form an electrical chain in which one part of one column or an entire column of one matrix represents a larger module. If it is desired to increase or reduce the number of digits for conversion it is merely necessary for lines or columns to be added or removed from the edge of the matrix.

In this connection it should be mentioned that the matrix structure is defined independently of the code employed for number encoding. The invention may therefore be applied equally for encoding of decimal numbers in the BCD-code as well as in other binary codes and can also be employed for encoding in non-binary codes having three or more different values of one physical quantity. Also, the invention may be applied to number systems to a base other than 2 and 10, for example to the duo-decimal system.

DESCRIPTION OF THE PREFERRED EMBODIMENTS

Figure 1:
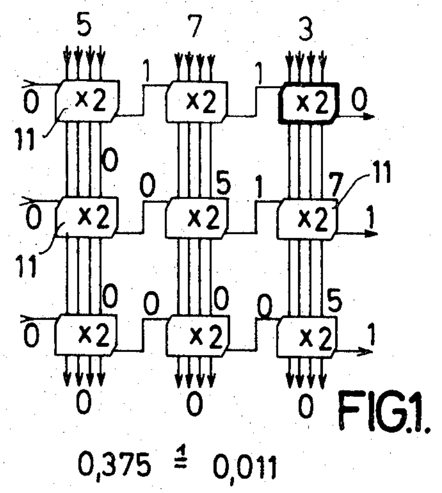
FIG. 1 is a section in diagrammatic form of the matrix according to the invention with an example for calculating the conversion of fractional decimal numbers into binary numbers.

For the respective conversion of binary and decimal numbers it is possible for the matrix according to the invention to be operated in two basically different manners, depending on whether the base *a* or the base *b* is employed for the decimal system. In FIG. 1, *a* is provided for the binary system and *b* for the decimal system. The individual logic elements of the matrix of which only one section of 3 × 3 elements 11 is shown in the illustration, therefore multiply the decimal column data with the factor 2 to provide a decimal multiplication result modulo 10 in the column direction while the incoming line data is employed during multiplication in the same way as a carry-over from a next lower valency and new line data indicates whether the multiplication result is greater than 9.

This may be made clear by reference to a numerical example explaining the conversion of fractional decimal numbers into fractional binary numbers. The decimal number is assumed to be 0.375 and is written into the column inputs of the matrix from right to left. What will then happen in the top line of the matrix[ Multiplication of the numeral 5 by 2 produces a 0 in the column direction and a carry-over of 1 in the line direction. In multiplying 7 by 2 it will be necessary for this carry-over to be taken into account so that the multiplication result will be 15. The numeral 5 appears in the column direction and the numeral 1 as carry-over in the line direction. The input numeral 3 together with the carry-over from the left produces a 7 in the column direction while a 0 appears at the line output of the matrix as the converted binary number of maximum valency. If the numerical example is continued it will be seen that a binary 1 appears in the second line and in the third line, that is to say 0.011 is the binary equivalent of the number that has been fed in.

The logic element appearing in the right upper corner of the matrix is specially marked by being heavily ringed since it represents the corner of the matrix, a feature which means that extensions of the matrix at the left-hand and lower edge are also possible.

Figure 2:
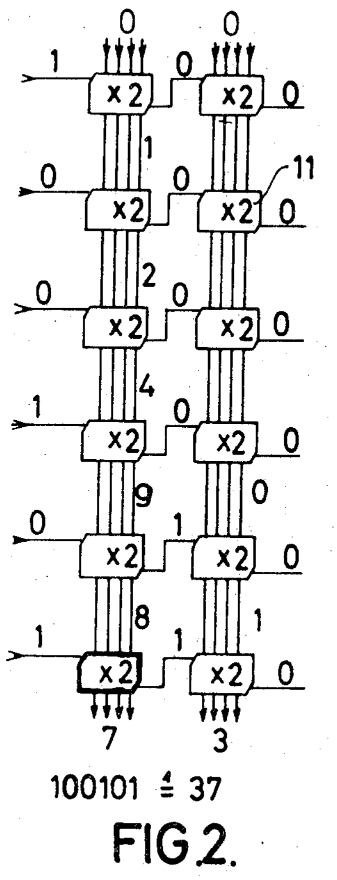
FIG. 2 is a further section of the same matrix showing a calculating example for converting whole binary numbers into decimal numbers.

A worked example for the inverse conversion in the same matrix will now be demonstrated by reference to FIG. 2. The binary number 100101 to be converted is applied to the line inputs of the matrix so that the bit with the lowest valency is disposed in the lowest line of the total matrix. The corresponding logic element in the first column is therefore once again shown heavily ringed. The decimal data 0 is applied to all column inputs, that is to say to the transmission paths for the decimal numerals. It is possible to dispense with the working out of the result in this case since the logic elements 11 have the same function as those of FIG. 1. This result is the number 37.

It has therefore been shown that a matrix having the characteristics $a = 1$ and $b = 10$ permits fractional decimal numbers and whole binary numbers to be converted into the respective other number system. The conversion of fractional binary numbers and of whole decimal numbers will now be explained by reference to the next two illustrations.

Figure 3:
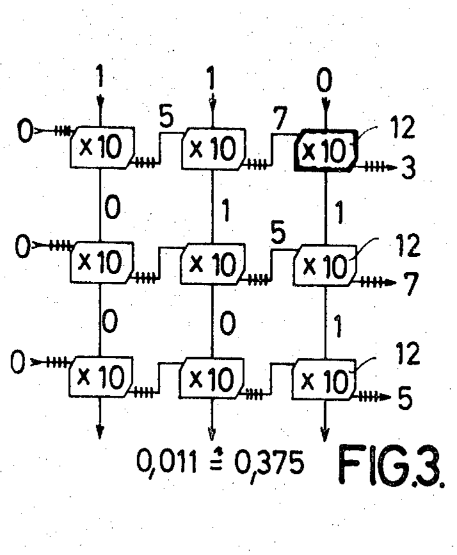
FIG. 3 is a section of a further matrix with a calculating example for the conversion of fractional binary numbers into decimal numbers.

FIG. 3 is a section of a matrix whose characteristics are $a = 10$ and $b = 2$. This means, that the logic elements 12 will multiply the incoming column data by 10, but it should be noted in this context that the aforementioned column data is binary data. In the same way as in FIG. 1 this relates to a section of the matrix disposed in the right-hand upper corner of the total matrix. Numerals were once again entered into the matrix to indicate the working out of the result, proceeding from the binary number 0.011. For example, the binary number of lowest valency multiplied by 10 modulo 2 in the column direction results in a 0 and in the line direction results in a carry-over of 5. In the first element of the middle column, said carry-over together with incoming binary data in the column direction produces the multiplication result 15 so that this result, modulo 2, that is to say a binary 1, is transmitted in the column direction while a carry-over of magnitude 7 is produced in the line direction. Finally, said carry-over in conjunction with the binary data 0 produces a multiplication result of 7 at the column input of the last column the modulo 2 thereof producing a binary 1 in the column direction and a 3 in the line direction. This decimal numeral represents the result digit of maximum valency. The two other result digits are formed in the same way in the further lines of the matrix.

Figure 4:
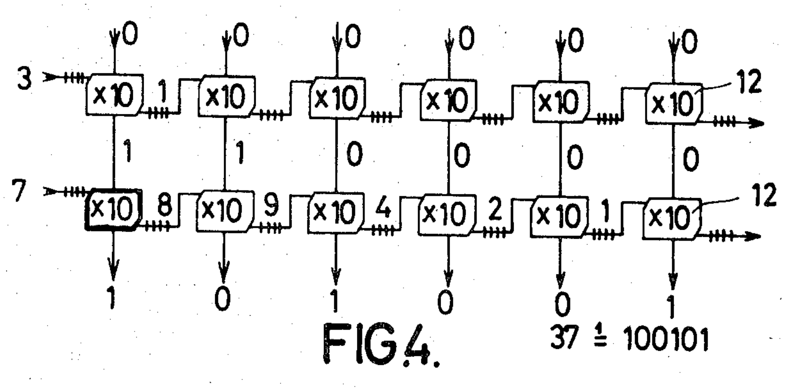
FIG. 4 is a further section of the same matrix with a calculating example for converting whole decimal numbers into binary numbers.

A worked example for the inverse operation relating to the above is illustrated in FIG. 4 in which the decimal number 37 is converted into a binary number. The said decimal number is written into the left-hand lower edge of the total matrix so that the decimal numeral of lowest valency is disposed in the lowest line. The binary result will be built up at the column outputs of the matrix by using the same computing rules as those relating to FIG. 3. It is therefore possible to dispense with showing these in this context.

In considering only binary-decimal conversion, it is possible for the invention to be utilised in a diverse manner. The simplest of these is a conversion of only one kind of number (fractional or whole numbers) of one number system, for example the decimal system, into the other. To this end a whole matrix will be required to which the data sources and result conductors are permanently connected.

However, conversions in both directions may be performed with one and the same matrix if due allowance is made for the fact that the conversion in one direction can be performed only with whole numbers and that in the other direction only with fractional numbers. To this end, the data sources and result conductors are connected with trivial circuit means, not shown, to the appropriate correct inputs in accordance with one of the FIGS. 1 to 4.

Figure 5:
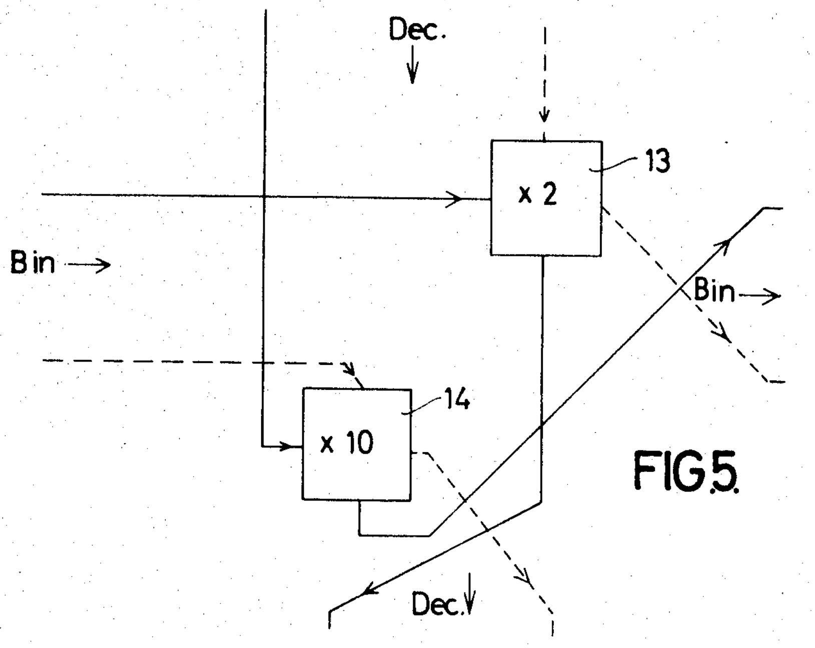
FIG. 5 is a general diagram showing two matrices according to FIG. 1 and FIG. 3.

A universal conversion on the other hand requires two whole matrices 13 and 14 which are illustrated in FIG. 5. In this case, the data lines for whole numbers are symbolised by solid lines and the data lines for fractional numbers are symbolised by interrupted lines. In such a system it is possible for whole and/or fractional numbers of one number system to be converted into the other and vice versa.

It should once again be pointed out that the logic structure of both matrices is completely identical. The only difference is in the construction of the logic elements of the matrices since in one case it is necessary to allow for the factor 2 and in the other to allow for the factor 10. The algorithm of a logic element may however be displayed in a general form, irrespective of the aforementioned differences, as can be seen by reference to FIG. 6. This shows a logic element, the line input of which is designated with $A_i$, the column input of which is designated with $B_i$, the line output of which is designated with $A_{i+1}$ and the column output of which is designated with $B_{i+1}$. The two formulae written into the illustration refer to the function of the element in general terms. The column data $B_{i+1}$ is calculated as modulo $b$ from the product of the incoming column data $B_i$ with the factor $a$ to which the line data $A_i$ is added.

Figure 6:
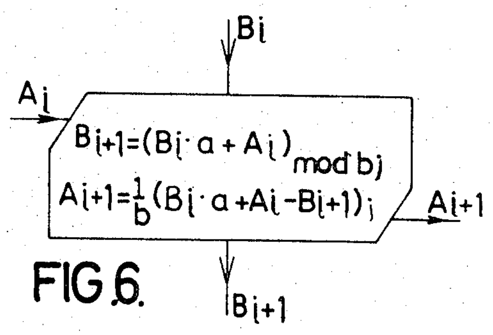
FIG. 6 is a logic element of one of the matrices showing its functions in conventional notation.
Figure 7:
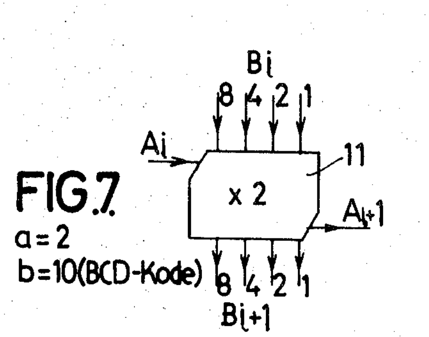
FIG. 7 is a logic element according to FIG. 1 and FIG. 6.
Figure 8:
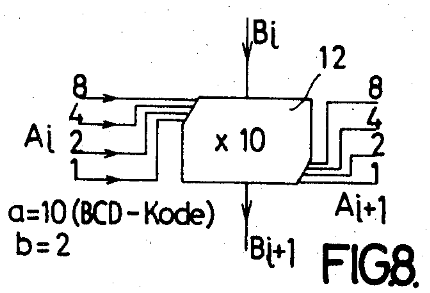
FIG. 8 is a logic element according to FIG. 3 and FIG. 6.

It should be noted that so far no reference has been made regarding the encoding of the decimal numbers. The formulae disclosed in FIG. 6 do not therefore represent a direct relationship to the technical embodiment of the logic elements since these formulae apply to any kind of decimal encoding, including any selectable code and any selectable base for the numbers to be converted. In order to complete the description the construction of a logic element for the encoding of binary numbers into decimal numbers is explained by reference to FIGS. 7 and 8, the decimal numbers being written in the BCD-code. The orientated transmission paths in the column direction comprise four conductors in the matrix whose multiplication factor is 2 ($a = 2$, $b = 10$), said conductors being designated with $B_{i8}$, $B_{i4}$, $B_{i2}$, $B_{i1}$ on the input side of each logic element 11 and with $B_{i+1,8}$, $B_{i+1,4}$, $B_{i+1,2}$, and $B_{i+1,1}$ on the output side. The binary logic junctions required to perform the functions in accordance with FIG. 6 are obtained from Table 1. Table 2 shows these junctions in circuit algebraic form. They comprise 4 OR gates having 2 or 3 inputs each and being driven by a total of 10 AND gates. According to the prior art of micrologic circuits, all junctions of Table 2 can be provided on a small plate the edges of which will also have to be provided with 10 binary data conductors and several voltage and earth conductors.

Table 3 is the truth table of the other matrix, the one having the multiplication factor 10 ($b = 2$) while Table 4 is a list of logic junctions for said table. This logic junction programme can also be accommodated on a micro plate. Such plates are then stacked to form cubes or columns and are provided with the necessary internal cross connections so that they represent part of a column or line or an entire column or line of matrix. To increase the number of digits of the matrix it is merely necessary for such a cube to be disposed adjacent those already present.

TABLE 1 ($a$=2; $b$=10 BCD)

| $A_i$ | $B_i$ 8 4 2 1 | $A_{i+1}$ | $B_{i+1}$ 8 4 2 1 |
|---|---|---|---|
| 0 | 0 0 0 0 | 0 | 0 0 0 0 |
| 0 | 0 0 0 1 | 0 | 0 0 1 0 |
| 0 | 0 0 1 0 | 0 | 0 1 0 0 |
| 0 | 0 0 1 1 | 0 | 0 1 1 0 |
| 0 | 0 1 0 0 | 0 | 1 0 0 0 |
| 0 | 0 1 0 1 | 1 | 0 0 0 0 |
| 0 | 0 1 1 0 | 1 | 0 0 1 0 |
| 0 | 0 1 1 1 | 1 | 0 1 0 0 |
| 0 | 1 0 0 0 | 1 | 0 1 1 0 |
| 0 | 1 0 0 1 | 1 | 1 0 0 0 |
| 1 | 0 0 0 0 | 0 | 0 0 0 1 |
| 1 | 0 0 0 1 | 0 | 0 0 1 1 |
| 1 | 0 0 1 0 | 0 | 0 1 0 1 |
| 1 | 0 0 1 1 | 0 | 0 1 1 1 |
| 1 | 0 1 0 0 | 0 | 1 0 0 1 |
| 1 | 0 1 0 1 | 1 | 0 0 0 1 |
| 1 | 0 1 1 0 | 1 | 0 0 1 1 |
| 1 | 0 1 1 1 | 1 | 0 1 0 1 |
| 1 | 1 0 0 0 | 1 | 0 1 1 1 |
| 1 | 1 0 0 1 | 1 | 1 0 0 1 |

TABLE 3 ($a$=10; $b$=2)

| $B_i$ | $A_i$ 8 4 2 1 | $B_{i+1}$ | $A_{i+1}$ 8 4 2 1 |
|---|---|---|---|
| 0 | 0 0 0 0 | 0 | 0 0 0 0 |
| 0 | 0 0 0 1 | 1 | 0 0 0 0 |
| 0 | 0 0 1 0 | 0 | 0 0 0 1 |
| 0 | 0 0 1 1 | 1 | 0 0 0 1 |
| 0 | 0 1 0 0 | 0 | 0 0 1 0 |
| 0 | 0 1 0 1 | 1 | 0 0 1 0 |
| 0 | 0 1 1 0 | 0 | 0 0 1 1 |
| 0 | 0 1 1 1 | 1 | 0 0 1 1 |
| 0 | 1 0 0 0 | 0 | 0 1 0 0 |
| 0 | 1 0 0 1 | 1 | 0 1 0 0 |
| 1 | 0 0 0 0 | 0 | 0 1 0 1 |
| 1 | 0 0 0 1 | 1 | 0 1 0 1 |
| 1 | 0 0 1 0 | 0 | 0 1 1 0 |
| 1 | 0 0 1 1 | 1 | 0 1 1 0 |
| 1 | 0 1 0 0 | 0 | 0 1 1 1 |
| 1 | 0 1 0 1 | 1 | 0 1 1 1 |
| 1 | 0 1 1 0 | 0 | 1 0 0 0 |
| 1 | 0 1 1 1 | 1 | 1 0 0 0 |
| 1 | 1 0 0 0 | 0 | 1 0 0 1 |
| 1 | 1 0 0 1 | 1 | 1 0 0 1 |

TABLE 2

$$A_{1+1}=B_{i,4}.B_{1,2}+B_{i,4}.B_{i,1}+B_{i,8};$$
$$B_{i+1,8}=B_{i,8}.B_{i,1}+B_{i,4}.\overline{B_{i,2}}.\overline{B_{i,1}};$$
$$B_{i+1,4}=B_{i,8}.\overline{B_{i,1}} + \overline{B_{i,4}}.B_{i,2} + B_{i,2}.B_{i,1} ;$$
$$B_{i+1,2}=B_{i,8}.\overline{B_{i,1}} + \overline{B_{i,8}}.\overline{B_{i,4}}.B_{i,1} + B_{i,4}.B_{i,2}.\overline{B_{i,1}} ;$$
$$B_{i+1,1}=A_i ;$$

TABLE 4

$$A_{i+1,8}=B_i.A_{i,8} + B_i.A_{i,4}.A_{i,2} ;$$
$$A_{i+1,4}=\overline{B_i}.A_{i,8} + B_i.\overline{A_{i,8}}.\overline{A_{1,4}} + B_i.\overline{A_{i,8}}.\overline{A_{i,2}} ;$$
$$A_{i+1,2}=\overline{B_i}.A_{i,4} + B_i.\overline{A_{i,4}}.A_{i,2} + B_i.\overline{A_{i,4}}.A_{i,2} ;$$
$$A_{i+1,1}=B_i.\overline{A_{1,2}} + \overline{B_i}.A_{i,2} ;$$
$$B_{i+1} =A_{i,1} ;$$

I claim:

1. Apparatus for the parallel conversion of numbers D to a base $d$ into corresponding numbers Z to a base $z$ and vice versa, comprising: first and second M × N matrices having electrical signals representing the digits of a number A applied to the line inputs thereof and electrical signals representing the digits of a number B applied to the column inputs thereof, said matrices comprising a plurality of substantially similar logic circuit elements which process electrical signals representing the digits of the numbers to be converted, a digit $A_i$ of the number A being applied to a line input of one of said logic circuit elements, a digit $B_i$ of the number B being applied to a column input of one of said logic circuit elements; said logic circuit elements comprising means generating a digit $B_{i+1}$ in the column outputs of said elements, where $$B_{i+1} = (B_i \cdot a + A_i)_{mod\ b}$$

and represents the remainder of the division of $B_i \cdot +$ $A_i$ by $b$, and further means generating a digit $A_{i+1}$ at the line outputs of said elements, where $$A_{i+1} = (1/b)\ (B_i{}^{54} \cdot a + A_i - B_{i+1})$$

and represents the quotient of said division; wherein the electrical signals at the column outputs of said matrices represent a number $$R = (B \cdot a^m + A)_{mod\ b^n}$$

representing the remainder of the division of $B \cdot a^m +$ A by $b^n$ and the electrical signal at the line outputs of said matrices represent a number $$Q = (1/b^n)\ (B \cdot a^m + A - R),$$

representing the quotient of said division; and further wherein said first matrix comprises logic elements having means to divide by the factor $z$ ($d$=$a$, $z$=$b$) and said second matrix comprises logic elements having means to divide by the factor $d$ ($z$=$a$, $d$=$b$).

2. An apparatus for the parallel conversion of numbers D to a base $d$ into corresponding numbers Z to a base $z$ including first and second M × N matrices, each matrix comprising a plurality of substantially similar logic circuit elements which process electrical signals representing the digits of the numbers to be converted, said first matrix comprising logic elements having means to divide by the factor $z$ and said second matrix comprising logic elements having means to divide by the factor $d$, a digit $A_i$ of a number A being applied to a row input of one of said logic circuit elements and a digit $B_i$ of a number B being applied to a column input of one of said logic circuit elements, said logic circuit elements further comprising means generating a digit $B_{i+1}$ in the column outputs of said elements, where $$B_{i+1} = (B_i \cdot a + A_i)_{mod\ b}$$

and represents the remainder of the division of $B_i \cdot a +$ $A_i$ by $b$, and further means generating a digit $A_{i+1}$ at the row outputs of said elements, where $$A_{i+1} = (1/b)\ (B_i \cdot a + A_i - B_{i+1})$$

and represents the quotient of said division, wherein the electrical signals at the column outputs of said matrices represent a number $$R = (B \cdot a^m + A)_{mod\ b^n}$$

representing the remainder of the division of $B \cdot a^m +$ A by $b^n$ and the electrical signal at the row outputs of said matrices represent a number $$Q = (1/b^n)\ (B \cdot a^m + A - R),$$

representing the quotient of said division, wherein a zero value is applied to the column inputs of the first matrix and to the row inputs of the second matrix; the integer part of the number to be converted is applied to the row inputs of the first matrix, such that the most significant digit of the integer part is applied to the row adjacent to the column inputs of the first matrix; and the fractional part of the number to be converted is applied to the column inputs of the second matrix, such that the most significant digit of the fractional part is applied to the column adjacent to the row outputs of the second matrix.

3. An apparatus for the parallel conversion of numbers Z to a base $z$ into corresponding numbers D to a base $d$ including first and second M × N matrices, each matrix comprising a plurality of substantially similar logic circuit elements which process electrical signals representing the digits of the numbers to be converted, said first matrix comprising logic elements having means to divide by the factor $z$ and said second matrix comprising logic elements having means to divide by the factor $d$, a digit $A_i$ of a number A being applied to a row input of one of said logic circuit elements and a digit $B_i$ of a number B being applied to a column input of one of said logic circuit elements, said logic circuit elements further comprising means generating a digit $B_{i+1}$ in the column outputs of said elements, where $$B_{i+1} = (B_i \cdot a + A_i)_{mod\ b}$$

and represents the remainder of the division of $B_i \cdot a +$ $A_i$ by $b$, and further means generating a digit $A_{i+1}$ at the row outputs of said elements, where $$A_{i+1} = 1/b\ (B_i \cdot a + A_i - B_{i+1})$$

and represents the quotient of said division, wherein the electrical signals at the column outputs of said matrices represent a number $$R = (B \cdot a^m + A)_{mod\ b^n}$$

representing the remainder of the division of $B \cdot a^m +$ A by $b^n$ and the electrical signal at the row outputs of said matrices represent a number $$Q = (1/b^n)\ (B \cdot a^m + A - R),$$

representing the quotient of said division, wherein a zero value is applied to the column inputs of the second matrix and to the row inputs of the first matrix; the integer part of the number to be converted is applied to the row inputs of the second matrix such that the most significant digit of the integer part is applied to the row adjacent to the column inputs of the second matrix; and the fractional part of the number to be converted is applied to the column inputs of the first matrix, such that the most significant digit of the fractional part is applied to the column adjacent to the row input.

* * * * *

UNITED STATES PATENT OFFICE
CERTIFICATE OF CORRECTION

Patent No. 3,758,766 Dated September 11, 1973

Inventor(s) Michel Combet

It is certified that error appears in the above-identified patent and that said Letters Patent are hereby corrected as shown below:

Column 4, line 22, "a = 1" should read -- a = 2 --.
Column 5, line 34, "$A_{1+1}$" should read -- $A_{i+1}$ --.
Column 6, Table 4, the third equation should read -- $A_{i+1,2}=B_i.A_{i,4} + B_i.A_{i,4}.A_{i,2} +B_i.A_{i,4}.A_{i,2}$ --.

Column 7, the equation bridging lines 16 and and 17, should read

-- $A_{i+1}= \frac{1}{b} (B_i \cdot a + A_i - B_i + 1)$ --.

Column 8, line 59, "input" should read -- output --.

Signed and sealed this 25th day of June 1974.

(SEAL)
Attest:

EDWARD M.FLETCHER,JR.
Attesting Officer

C. MARSHALL DANN
Commissioner of Patents